Aug. 5, 1941.  G. PETTIGREW  2,251,374
DISPENSING DEVICE
Filed March 23, 1940  2 Sheets-Sheet 1
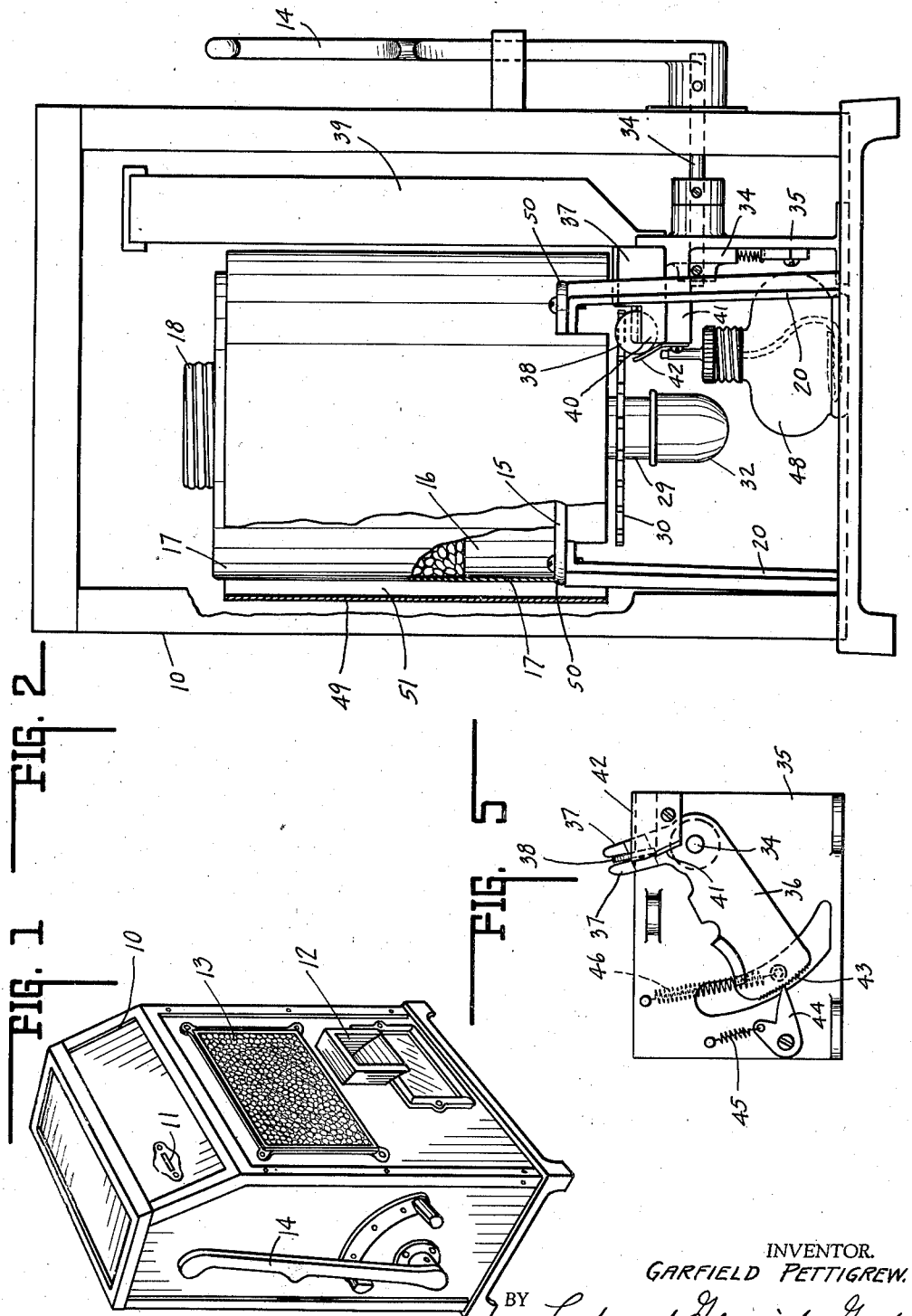
INVENTOR.
GARFIELD PETTIGREW.
BY Lockwood, Goldsmith & Galt,
ATTORNEYS.

Aug. 5, 1941.　　　　G. PETTIGREW　　　　2,251,374
DISPENSING DEVICE
Filed March 23, 1940　　　2 Sheets-Sheet 2
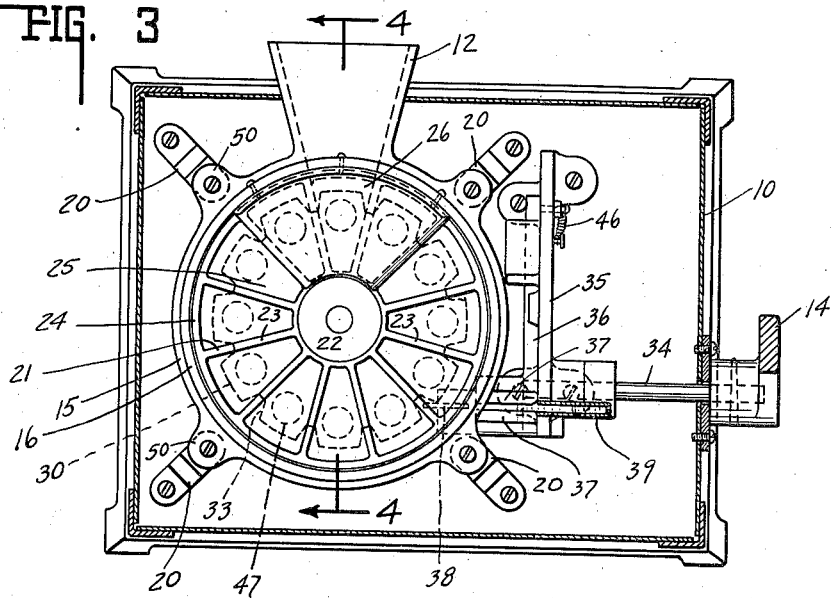
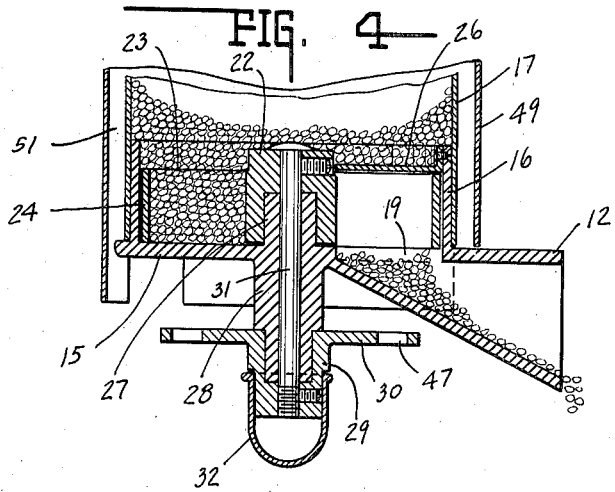
INVENTOR.
GARFIELD PETTIGREW.
BY Lockwood, Goldsmith & Galt.
ATTORNEYS.

Patented Aug. 5, 1941

2,251,374

UNITED STATES PATENT OFFICE 2,251,374

DISPENSING DEVICE

Garfield Pettigrew, Elwood, Ind.

Application March 23, 1940, Serial No. 325,569

3 Claims. (Cl. 221—108)

This invention relates to a dispensing device. The invention is particularly adapted to dispensing a product which is improved by heating, such as salted peanuts and the like, but certain features thereof are equally valuable for the dispensing of other products.

One object of the invention is to provide heating means which may operate over a considerable period of time without overheating the product.

Another object of the invention is to so arrange the heating means as to heat the product just before dispensing to the highest temperature, the remainder of the product remaining warm but not so highly heated as that finally dispensed.

Another object of the invention is to so arrange the parts that a heater burning liquid or gaseous fuel may be used without danger of contaminating the product by fumes from the heater.

Other objects and features of the invention will be understood from the accompanying drawings and the following description and claims.

Fig. 1 is a perspective view of the complete dispensing device. Fig. 2 is a rear view thereof with the back of the cabinet removed and with parts cut away to show other parts in detail. Fig. 3 is a plan view with parts shown in section and other parts removed. Fig. 4 is a fragmentary sectional view on the line 4—4 of Fig. 3. Fig. 5 is an elevational view of certain coin control parts which may be used with the invention.

In the preferred form of the invention shown in the drawings, there is provided a cabinet 10 having a coin receiving opening 11, a delivery chute 12, a window 13 behind which a quantity of the product dispensed may be packed, and an operating handle 14. Within the cabinet there is provided a container for the product consisting of a bottom member 15 having an upturned annular flange 16 and a cylindrical member 17 telescoping over the flange 16. The member 17 is closed at the top except for a threaded neck having a cap 18 by removal of which the container may be filled. The bottom member 15 is provided with a discharge opening 19 communicating with the delivery chute 12 and is supported on legs 20 from the bottom of the cabinet. A metering spider 21 consisting of a hub 22, arms 23 and an outer ring 24 is seated within the bottom member 15. The arms 23 define compartments 25 therebetween each of which is adapted to contain a predetermined quantity of the product and each of which is substantially the same size and shape as the delivery opening 19. A baffle 26 is mounted on the flange 16 above that portion of the spider 21 immediately above the opening 19, and prevents the passage of the product from the interior of the container 17 directly to the delivery opening.

The hub 22 is formed with an interior recess closely fitting a boss 27 formed on the bottom of the member 15. A similar boss 28 extends downwardly from the undersurface of said member and enters a similar recess in a hub 29 of an indexing wheel 30. A vertical stem 31 is journaled in the bosses 27 and 28 and is secured by suitable means to the hubs 22 and 29. A hub cap 32 is fitted over the hub 29 and may be retained thereon by friction or by suitable fastening means. The indexing wheel 30 is provided with a plurality of notches 33 equal in number to the number of the compartments 25.

The operating handle 14 is mounted on a stem 34 journaled in the side wall of the cabinet 10 and in a bracket 35 within said cabinet. A member 36 having a pair of upwardly projecting wings 37 is mounted on said stem in position to receive between said wings a coin 38 dropped down a chute 39 from the coin opening 11. As best seen in Fig. 2, the wings 37 between which the coin is received are reduced in height as shown at 40. When the coin reaches this position, it rests on a shelf 41 projecting from the bracket 35 and its movement is stopped by a plate 42 secured to said shelf. In the normal idle position of the parts, the wings 37 are substantially vertical and are aligned with one of the notches 33 on the indexing wheel 30 so that the coin when received rests with its edge in one of said notches, as shown in Fig. 3. With the coin in this position the operating handle 14 may be pulled forwardly, pressing the coin against the edge of the notch 33 and turning the indexing wheel through a predetermined fraction of a revolution. In Fig. 5 the parts are shown in the position assumed just prior to the end of said movement. Further movement of the lever 14 brings the coin to the edge of the shelf 41. Upon passing said edge the coin drops from between the wings 37 and may fall into any suitable container supplied for the purpose.

The member 36 is provided with a serrated edge 43 engaged by a pawl 44 operated by a spring 45 to prevent reversal of movement of the lever 14 before a movement in one direction has been completed. A spring 46 attached to the member 36 and to the bracket 35 returns the parts to initial position upon release of the handle 14. By this means the spider 21 may be rotated step by step as coins are presented and the lever 14 is operated. The compartments 25 are successively brought to the discharge opening 19 and their contents discharged through said opening.

The indexing wheel 30 is provided with a plurality of openings 47, each one positioned beneath one of the compartments 25. Beneath the normal position of one of said openings there is placed a heater 48 which is herein shown in the form of a lamp adapted to burn liquid fuel such as alcohol or kerosene. Preferably the lamp is placed beneath one of the compartments 25 close to the discharge opening 19 where the product about to be discharged receives the greatest amount of heat. The remainder of the product in the compartment 25 receives some heat by conduction through the metallic bottom member 15, adjacent compartments of course receiving more heat than those more remote from the discharge opening. Thus the product is discharged at the highest temperature while the remainder of the product is gradually pre-heated. About the container 17 there is provided an outer shell 49 resting on lugs 50 projecting from the member 15. Between the container 17 and the shell 49 there is provided a space 51 which serves as a passage for products of combustion leading upwardly about the container. Thus a certain amount of pre-heating is supplied for the entire contents of the container 17.

The provision of the bosses 27 and 28 provides an elongated closely fitting bearing for the stem 31 which minimizes leakage of fumes from the heater along said stem into the container 17. The provision of the hub cap 32 serves further to prevent fumes from entering the container. The product is thus preserved from contamination by the fumes.

The invention has been described in one of its preferred forms, the details of which may be varied without departing from the scope thereof as defined by the appended claims. For example, I have described a heater in the form of a lamp burning liquid fuel. Obviously, a gas heater or other well known type may be used as well.

The invention claimed is:

1. In a dispensing device, a container for product to be dispensed, said container having a delivery opening in the bottom thereof, a metering spider rotatably mounted in the bottom of said container and having compartments each adapted to contain a predetermined quantity of said product, said spider being rotatable to bring said compartments successively into position above said discharge opening to discharge the contents thereof, a stationary baffle covering the compartment at said discharge opening, a hub formed on said spider and provided with a central recess, a boss formed on the bottom of said container and fitting into said recess with a close running fit to minimize gas leakage, a vertical stem journaled in said boss and carrying said spider, an indexing wheel mounted on said stem beneath said container, and means for rotating said indexing wheel step by step to move said compartments successively to said discharge opening.

2. In a dispensing device, a container for product to be dispensed, said container having a delivery opening in the bottom thereof, a metering spider rotatably mounted in the bottom of said container and having compartments each adapted to contain a predetermined quantity of said product, said spider being rotatable to bring said compartments successively into position above said discharge opening to discharge the contents thereof, a stationary baffle covering the compartment at said discharge opening, a hub formed on said spider and provided with a central recess, a boss formed on the bottom of said container and fitting into said recess with a close running fit to minimize gas leakage, a vertical stem journaled in said boss and carrying said spider, an indexing wheel mounted on said stem beneath said container, said indexing wheel having a hub provided with a central recess, a boss formed on the bottom of said container and fitting within said last mentioned recess with a close running fit, and means for rotating said indexing wheel step by step to move said compartments successively to said discharge opening.

3. In a dispensing device, a container for product to be dispensed, said container having a delivery opening in the bottom thereof, a metering spider rotatably mounted in the bottom of said container and having compartments each adapted to contain a predetermined quantity of said product, said spider being rotatable to bring said compartments successively into position above said discharge opening to discharge the contents thereof, a stationary baffle covering the compartment at said discharge opening, a hub formed on said spider and provided with a central recess, a boss formed on the bottom of said container and fitting into said recess with a close running fit to minimize gas leakage, a vertical stem journaled in said boss and carrying said spider, an indexing wheel mounted on said stem beneath said container, said indexing wheel having a hub provided with a central recess, a boss formed on the bottom of said container and fitting within said last mentioned recess with a close running fit, a hub cap covering the hub of said indexing wheel, and means for rotating said indexing wheel step by step to move said compartments successively to said discharge opening.

GARFIELD PETTIGREW.